United States Patent [19]

Utashiro

[11] Patent Number: 5,902,172
[45] Date of Patent: May 11, 1999

[54] METHOD OF POLISHING MEMORY DISK SUBSTRATE

[75] Inventor: Tomoya Utashiro, Oyama, Japan

[73] Assignee: Showa Aluminum Corporation, Osaka, Japan

[21] Appl. No.: 08/929,350

[22] Filed: Aug. 22, 1997

[51] Int. Cl.$^6$ .................................................. B24B 1/00
[52] U.S. Cl. ........................ 451/28; 451/63; 427/130; 428/65.3
[58] Field of Search .................................. 451/28, 41, 63, 451/60; 438/633, 693, 692; 427/129, 130, 128, 131; 428/65.3, 65.5, 141, 336, 694 T, 694 TS, 694 TM, 694 TR, 694 TP

[56] References Cited

U.S. PATENT DOCUMENTS

| | | | |
|---|---|---|---|
| 4,816,119 | 3/1989 | Rauch et al. | 204/29 |
| 5,223,304 | 6/1993 | Yasuda et al. | 427/129 |
| 5,506,017 | 4/1996 | Ranjan et al. | 428/65.7 |
| 5,586,926 | 12/1996 | Wedell et al. | 451/59 |
| 5,645,471 | 7/1997 | Strecker | 451/59 |
| 5,733,178 | 3/1998 | Ohishi | 451/41 |
| 5,750,230 | 5/1998 | Ishikawa et al. | 428/65.3 |

FOREIGN PATENT DOCUMENTS

| | | |
|---|---|---|
| 63-260762 | 10/1988 | Japan . |
| 09063049 | 3/1997 | Japan . |

*Primary Examiner*—David A. Scherbel
*Assistant Examiner*—Derris Holt Banks
*Attorney, Agent, or Firm*—Flynn, Thiel, Boutell & Tanis, P.C.

[57] ABSTRACT

In a method of polishing a Ni—P plated aluminum alloy memory disk substrate, the present invention provides a polishing method which can efficiently form a good polished surface having slight polishing flaws, restrain the generation of a defect other than the polishing flaws and has a high productivity. That is, in the method according to the present invention, an alumina abrasive grain is used as a polishing compound. The present invention solves the problem by dividing the polishing process into two steps. In the first step, a first polishing is performed in which the main work pressure is 80 g/cm$^2$ or more and the amount of polishing is 1 $\mu$m or more. A second polishing is then peformed in which the main work pressure is 80 g/cm$^2$ or less, preferably 50 g/cm$^2$ or less, and the amount of one-sided polishing is 2 $\mu$m or less. A final finish polishing is performed for 10–60 seconds prior to the completion of the second polishing step in which the main work pressure is 30 g/cm$^2$ or less and the average relative velocity of the substrate and polishing cloth is reduced to 50 cm/s or less. In the present invention, the supply of polishing slurry and cleaning solution is preferably stopped during the final finish polishing step.

5 Claims, No Drawings

METHOD OF POLISHING MEMORY DISK SUBSTRATE

BACKGROUND OF THE INVENTION

1. Field of the Invention

The present invention relates to a method of polishing a Ni—P plated aluminum alloy memory disk e a substrate for a high-capacity hard disk which uses an MR head and the like.

2. Description of the Related Art

Heretofore, a Ni—P plated aluminum alloy memory disk substrate has been finished using a double-sided polishing machine with a polyurethane polishing cloth and an alumina polishing compound by only one polishing. Recently, as the capacity of media becomes higher, a greater reduction of the roughness of the polished substrate has been required. Meeting this requirement has been accomplished mainly by reducing the average particle diameter of the polishing compound.

However, when the average particle diameter of the polishing compound is reduced, workability and productivity deteriorate, thus resulting in an increase in cost. In addition, an adverse effect arises of the waviness of the plated substrate being difficult to remove. Moreover, a further increasing of the capacity causes the amount of head float to be reduced. Even a polishing flaw (hundreds of Å in depth), which is generated during the polishing and has been heretofore allowed, is defined as a failure. Therefore, a polished substrate, which simply has a small surface roughness, is not considered to be fit for use.

Accordingly, Japanese Patent Application Laid-open No. 63049/1997 discloses a polishing process as described above which is divided into two steps wherein a slurry which contains a polishing compound whose average particle diameter and maximum particle diameter are successively restricted is provided for a surface to be polished. According to the invention described in No. 3049/1997, the polishing compound is successively provided with a smaller size of the particle diameter in first and second polishing steps so as to polish the surface. Thus, in the first polishing step, the roughness on the surface to be polished is rapidly polished, and the waviness is removed at the same time. In the second polishing step, a flat polished surface is intended to be obtained. However, according to the invention described in No. 63049/1997, since polishing conditions, such as work pressure, remain as it is during the first and second polishing steps and abrasive grains, each having a different particle diameter, are changed in the same polishing machine from a large size to a smaller size so as to perform the polishing, there is a fear that the large diameter abrasive grain used in the first polishing step remains during the second polishing step, causing a problem such as a difficulty in removing the polishing flaws or the like.

SUMMARY OF THE INVENTION

It is an object of the present invention to provide a method of polishing a Ni—P plated memory disk substrate which can solve the above-described problems of the conventional method, efficiently form a good polished surface having few polishing flaws, restrain the generation of a defect other than the polishing flaws and has a high productivity.

That is, the present invention intends to solve the above-described problem by, in the method of polishing the Ni—P plated memory disk substrate, dividing the polishing process into two steps. In the present invention, an alumina abrasive grain is used as a polishing compound. An additive such as a polishing accelerator may be added, if necessary. In the first step, a first polishing is performed in which the main work pressure is 80 g/cm$^2$ or more and the amount of polishing is 1 $\mu$m or more. A second polishing step is then performed in which the main work pressure is 80 g/cm$^2$ or less and the amount of one-sided polishing is 2 $\mu$m or less. A final finish polishing is performed for 10–60 seconds prior to the completion of the second polishing step in which the main work pressure is 30 g/cm$^2$ or less and the average relative velocity of the substrate and a polishing cloth is reduced to 50 cm/s or less. In the present invention, preferably, the supply of polishing slurry and cleaning solution is stopped during the final finish polishing step.

DETAILED DESCRIPTION OF THE PREFERRED EMBODIMENTS

Hereinafter, a method according to the present invention will be described following each step. In the first step, a first polishing step is accomplished in accordance with a polishing step using the usual alumina abrasive grain. That is, more specifically, an alumina abrasive grain which has an average particle diameter (D50) ranging from 1 to 2 $\mu$m is used. The main work pressure is 80 g/cm$^2$ or more. The flow rate of the polishing slurry is 100 ml/min. The average relative velocity of the substrate and the polishing cloth is approximately 100 cm/s. However, in the present invention, this polishing by the use of the usual alumina abrasive grain is performed to solely carry out rough machining for mainly removing waviness, plating defects or the like. Polishing to a predetermined roughness such as 1 $\mu$m or more, preferably to about 1–5 $\mu$m, is sufficient.

In the first polishing step, the substrate is rough-finished to a predetermined roughness, and the plating defect or the like is removed from the substrate. Next, the substrate is provided for a second polishing step.

In the second polishing step, in order to restrain the generation of polishing flaws as much as possible, the main work pressure is 80 g/cm$^2$ or less, and preferably, 50 g/cm$^2$ or less. The average relative velocity of the substrate and the polishing cloth is 100 cm/s or less. The alumina abrasive grain for use in the second polishing step is one having an average particle diameter (D50) of 1 $\mu$m or less. The amount of one-sided polishing is 2 $\mu$m or less so as to perform the polishing.

For about 10–60 seconds prior to the completion of the second polishing step, the main work pressure is 30 g/cm2 or less. The average relative velocity of the substrate and the polishing cloth is 50 cm/s or less. During the polishing prior to the completion of the second polishing step, preferably, the supply of the polishing slurry and cleaning solution is stopped to perform the polishing.

In the first and second polishing steps, different polishing machines are used respectively so that the relatively large abrasive grain used in the first polishing step does not remain during the second polishing step.

Embodiments will be described below.

Embodiments

A donut-shaped aluminum alloy blank material (counterpart of 5086) which is 3.5 in. in outer diamter and 0.8 mm in thickness is turned. A Ni—P plated memory disk substrate is then polished by means of a method according to the present invention. The polishing is performed in accordance with conditions shown in Table 1. The result is shown in Table 2. For comparison, the polishing is performed by means of a conventional method in accordance with the conditions shown in Table 1. The result is shown in Table 2. In each polishing test, different polishing machines for use in a first and second polishing steps are used, respectively. Twenty-five substrates are set in the respective polishing machines. Five substrates thereof are arbitrarily extracted and are used so as to measure the surface roughness (Ra), waviness (Wca) and polishing flaw depth as described below.

TABLE 1

|  |  | Main work pressure (g/cm$^2$) | Average relative velocity (cm/s) | Alumina abrasive grain diameter ($\mu$m) | Flow rate of a polishing slurry (ml/min) | Working time (sec) |
| --- | --- | --- | --- | --- | --- | --- |
| Embodiments of the present invention | Once | 100 | 100 | 1–2 | 100 | 180 |
|  | Twice | 50 | 100 | 0.8 | 100 | 150 |
|  |  | 25 | 50 | Absent | Absent | 10–60 |
| Prior art | Once | 80 or more | 100 | 0.5–1 | 100 | 360 |

TABLE 2

|  |  | Amount of polishing | Presence/ absence of cleaning solution | Surface roughness | Polishing flaw | Waviness |
| --- | --- | --- | --- | --- | --- | --- |
| Embodiments of the present invention | Once | 1.5 $\mu$m | Present | Ra = 9 Å Rt = 110 Å | 70 Å | 15 Å |
|  | Twice | 0.5 $\mu$m | Absent |  |  |  |
| Prior art | Once | 1.5 $\mu$m | Present | Ra = 15 Å Rt = 180 Å | 130 Å | 30 Å |

For each memory disk substrate, the measurement of the surface roughness (Ra), waviness (Wca) and polishing flaw depth is accomplished, represented by the average value of the five samples as described above.

Surface roughness
  Testing machine: Tencor P12, manufactured by Tencor
  Feeler diameter: 0.2 $\mu$m
  Scan length: 250 $\mu$m
  Scan speed: 5 $\mu$m/s
  Cut off: 25 $\mu$m
Waviness: it is measured by a waviness (Wca) reference on a center line of a filtrate.
  Testing machine: Tencor P12, manufactured by Tencor
  Feeler diamter: 0.2 $\mu$m
  Scan length: 5 $\mu$m
  Scan speed: 400 $\mu$m/s
  Cut off: 800 $\mu$m
Polishing flaw depth
  Testing machine: MHT-3 System, manufactured by WYKO
  Measurement magnification: ×400
  PSI mode (a mode for measuring a fine region)

According to the present invention described above, there is obtained a method of polishing a Ni—P plated aluminum alloy memory disk substrate which can efficiently form a good polished surface having few polishing flaws, can also restrain the generation of a defect other than the polishing flaws and has a high productivity.

What is claimed is:

1. A method of polishing a Ni—P plated memory disk substrate in which an alumina abrasive grain is used as a polishing compound, said method comprising the steps of:

a first polishing step of supplying a polishing slurry and a cleaning solution to the substrate and polishing the substrate in a polishing machine at a main work pressure of at least 80 g/cm$^2$ to achieve an amount of polishing of the substrate to a roughness of at least 1 $\mu$m;

a second polishing step of supplying a polishing slurry and a cleaning solution to the substrate and polishing the substrate in a polishing machine containing a polishing cloth at a main work pressure of no more than 80 g/cm$^2$ and an average relative velocity of the substrate and the polishing cloth of no more than 100 cm/s to achieve an amount of polishing of one side of the substrate of no more than 2 $\mu$m; and 10–60 seconds prior to the completion of the second polishing step, performing a final finish polishing of the substrate at a main work pressure no greater than 30 g/cm$^2$ and an average relative velocity of the substrate and the polishing cloth no greater than 50 cm/s.

2. The method according to claim 1, wherein the supply of polishing slurry and cleaning solution is stopped during said final finish polishing.

3. The method according to claim 1, wherein the main work pressure is 50 g/cm$^2$ or less in said second polishing step.

4. The method according to claim 1, wherein an alumina abrasive grain having an average diameter of 1–2 $\mu$m is used in said first polishing step and an alumina abrasive grain having an average diameter of 1 $\mu$m or less is used in said second polishing step.

5. A method of polishing a Ni—P plated memory disk substrate in which an alumina abrasive grain is used as a polishing compound, said method comprising the steps of:

a first polishing step of supplying a polishing slurry containing an alumina abrasive grain having an average particle diameter of from 1 to 2 $\mu$m and a cleaning solution to the substrate and polishing the substrate in a first polishing machine at a main work pressure of at least 80 g/cm$^2$ to achieve an amount of polishing of the substrate to a roughness of at least 1 $\mu$m;

removing the substrate from the first polishing machine and introducing it to a second polishing machine containing a polishing cloth;

a second polishing step of supplying a polishing slurry containing an alumina abrasive grain having an average particle of no more than 1 μm and a cleaning solution to the substrate and polishing the substrate in the second polishing machine at a main work pressure of no greater than 80 g/cm$^2$ and an average relative velocity of the substrate and the polishing cloth of no more than 100 cm/s to achieve an amount of polishing of one side of the substrate of no more than 2 μm; and 10–60 seconds prior to the completion of the second polishing step, performing a final finish polishing of the substrate at a main work pressure no greater than 30 g/cm2 and an average relative velocity of the substrate and the polishing cloth no greater than 50 cm/s.

\* \* \* \* \*